US 6,597,995 B1

(12) United States Patent
Cornu et al.

(10) Patent No.: US 6,597,995 B1
(45) Date of Patent: Jul. 22, 2003

(54) METHOD FOR FORMING A 3D KINEMATIC DEFORMATION MODEL OF A SEDIMENTARY BASIN

(75) Inventors: Tristan Cornu, Paris (FR); Frédéric Schneider, L'Etang la Ville (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 112 days.

(21) Appl. No.: 09/703,724

(22) Filed: Nov. 2, 2000

(30) Foreign Application Priority Data

Nov. 5, 1999 (FR) .......................................... 99 14032

(51) Int. Cl.$^7$ ................................................ G01V 1/28
(52) U.S. Cl. ................................ 702/17; 702/5; 702/16
(58) Field of Search ............................. 702/17, 14, 16, 702/18, 5; 345/423; 367/73

(56) References Cited

U.S. PATENT DOCUMENTS

| 5,844,564 A | * 12/1998 | Bennis et al. ................ 345/423 |
| 5,953,680 A | * 9/1999 | Divies et al. ................... 702/5 |
| 6,370,491 B1 | * 4/2002 | Malthe-Sorenssen et al. .. 703/2 |
| 6,480,790 B1 | * 11/2002 | Calvert et al. ................ 702/14 |

* cited by examiner

Primary Examiner—Edward Lefkowitz
Assistant Examiner—Anthony Gutierrez
(74) Attorney, Agent, or Firm—Antonelli, Terry, Stout & Kraus, LLP

(57) ABSTRACT

A method for forming a prograde kinematic model allowing reproduction in 3D intermediate geometries of geologic objects of an underground zone such as a sedimentary basin, from an initial state to a current state. A representation of the current geometry of the geologic objects of the zone is formed by interpretation of acquired data obtained by seismic exploration, by in-situ measurements and by observations, then each geologic object is subdivided into layers separated by deformation interfaces. Each one of the layers is defined by means of a grid pattern into a series of hexahedral volume elements. Tectonic deformations are then applied separately and successively to each series of volume elements of a layer in relation to an underlying layer while conserving the thickness and the surface area of an intermediate neutral surface in each volume element. Then the tectonic deformations are iteratively modified until a geologic representation substantially in accordance with the known final state of the underground zone is obtained.

6 Claims, 9 Drawing Sheets

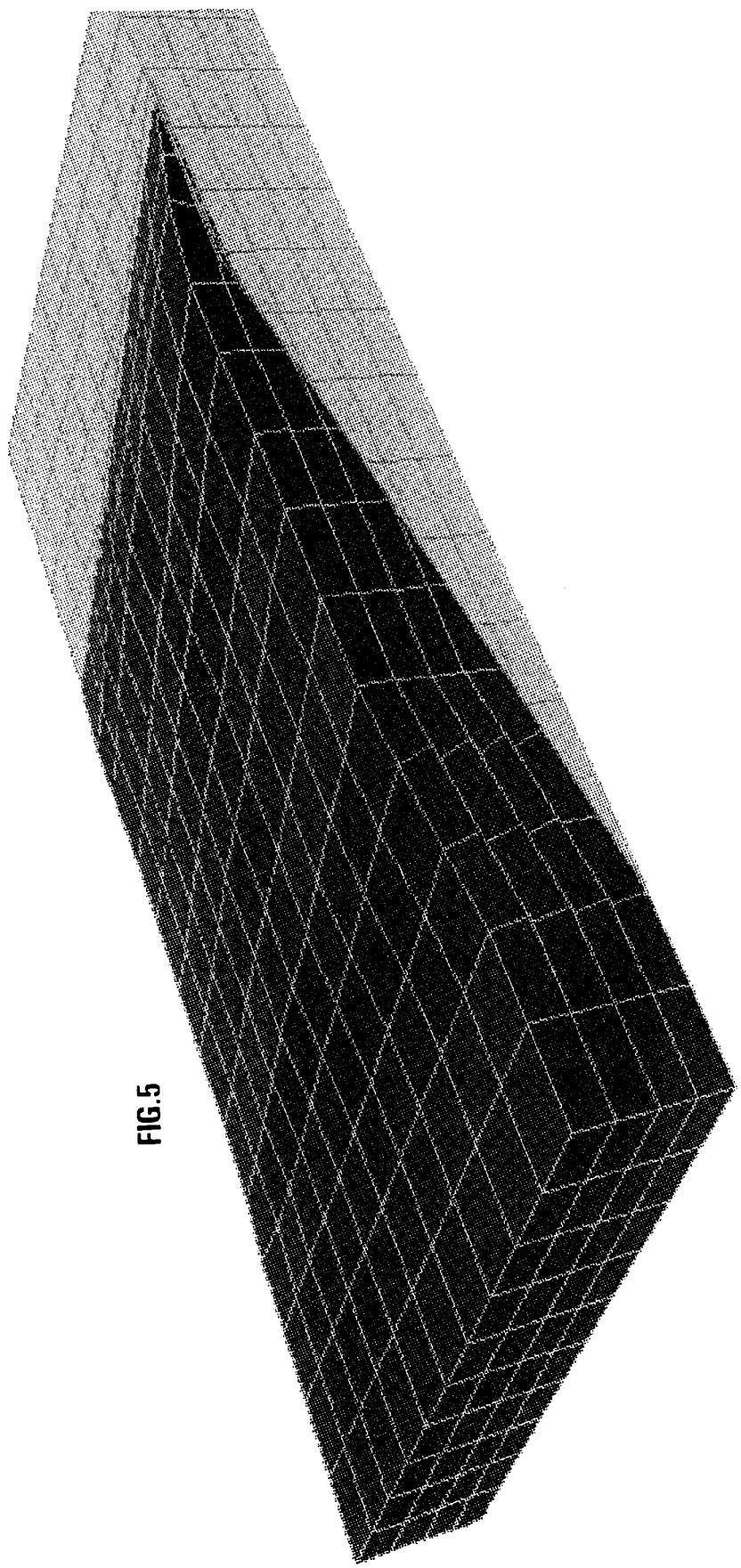

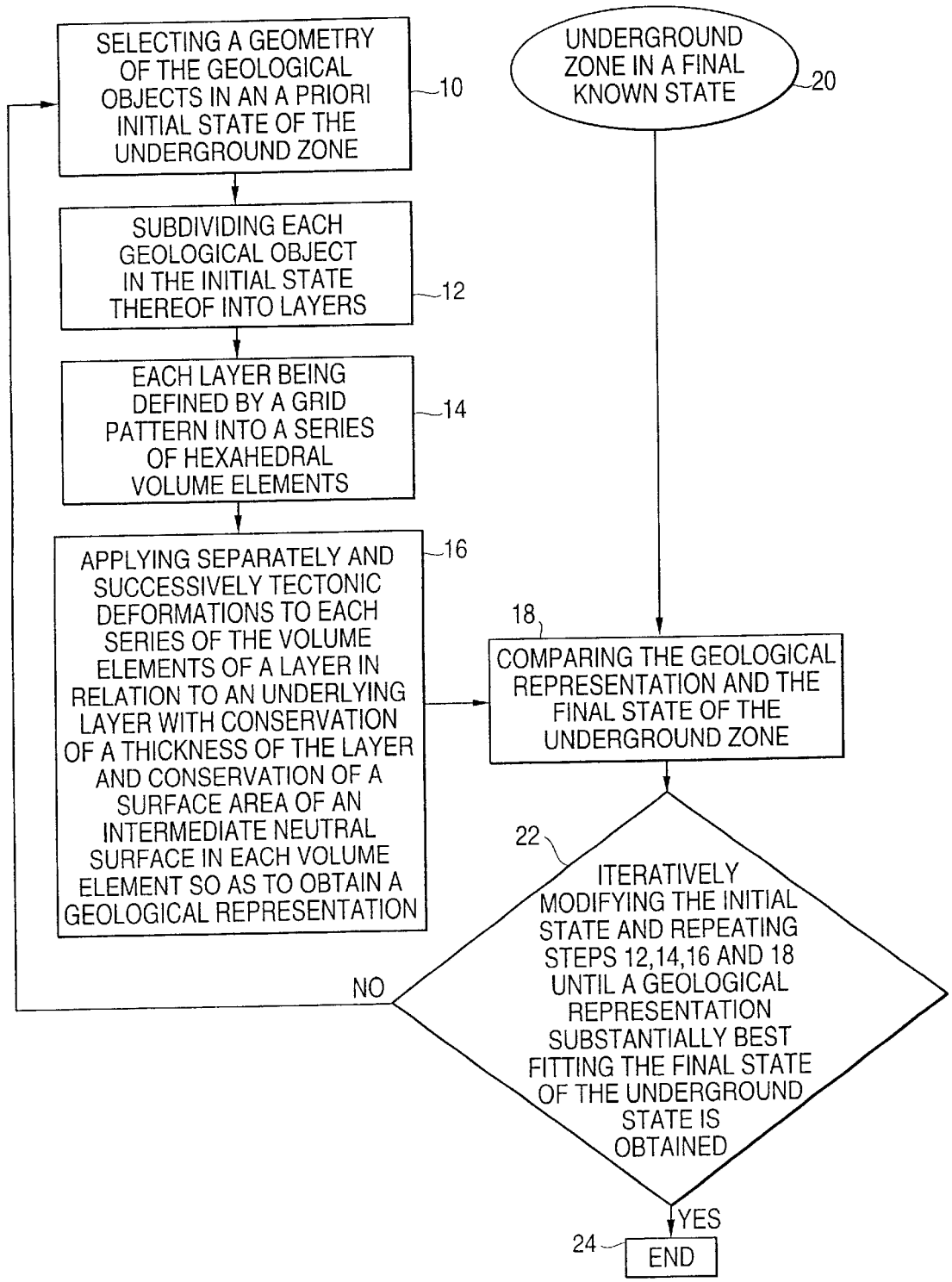

METHOD FOR FORMING A 3D KINEMATIC DEFORMATION MODEL OF A SEDIMENTARY BASIN

FIELD OF THE INVENTION

The present invention relates to a method for forming a 3D kinematic deformation model of a sedimentary basin from an initial non-deformed state.

DESCRIPTION OF THE PRIOR ART

Mechanical 3D models of sedimentary basin deformations have already been made. However, these models lead to very complex formulations that have substantial calculating time. An example of such a modeling method is for example described by:

Scott M. et al (1991) <<Geometrical Modeling of Fault-related Folds: a Pseudo-three-dimensional Approach>>; Journal of Structural Geology, 13, pp.801–812.

Among the existing kinematic models of sedimentary basins, the following models working in 2D can for example be mentioned, described by:

Suppe J. <<Geometry and Kinematic of Fault-bent Folding>>, Am. Journal of Science, 283, pp.684–721 (1993), which does not deal with mechanical compaction, and Waltham D. <<Finite Difference Modeling of Sandbox Analogues, Compaction and Detachment Free Deformation>>, in Journal of Structural Geology, Vol.12, 3, pp.375–381, 1990, which considers local simple shears but without respecting bank lengths and thicknesses.

French Patent 2,748,516 describes a method for 2D modeling, from a non-deformed initial state, of the evolution of a geologic basin in time by taking account of a) the slip along major tectonic discontinuities with inner deformation of the sediments and of b) the mechanical compaction due to the burial of sediments by tectonic deformation or sedimentation. After preliminary subdivision of the geologic objects of the basin into a certain number of layers or banks, by boundaries (stratigraphic discontinuities defining banks, faults defining imbricate structures, etc.) whose geometrical position is known, the banks are defined by means of grid patterns, the tectonic deformation of each discretized layer is determined separately by respecting as far as possible the thickness and the length thereof, and the grid patterns are modified in order to take account of the compaction associated with the burial variations of the gridded elements. This method is implemented by the FOLDIS™ software.

There are other 2D or <<pseudo-3D>> models limited to the study of cylindrical symmetry cases or constructed from topologically equivalent 2D sections. An example is described by:

Shaw J. G. et al: Structural Trend Analysis by Axial Surface Mapping; AAPG Bulletin, 78, pp.700–721, 1994.

SUMMARY OF THE INVENTION

The method according to the invention forms a (prograde) kinematic model which reproduces in 3D intermediate geometries of geologic objects of an underground zone, from an initial state to a known current state, by interpretation of acquired seismic data, measurements and observations. The method comprises the following steps:

forming a representation of the current geometry of the geologic objects of the zone by interpretation of acquired data obtained by seismic exploration, in-situ measurements and observations;

subdividing each geologic object into superimposed layers, each one of these layers being defined by means of a grid pattern into a series of hexahedral volume elements;

applying separately and successively tectonic deformations to each series of volume elements of a layer in relation to an underlying layer while conserving the thickness and the surface area of an intermediate neutral surface in each volume element; and modifying iteratively the applied tectonic deformations until a geologic representation substantially in accordance with the known final state of the underground zone is obtained.

By applying thereafter, to a modeling tool of a well-known type, geochemical, thermal or other data associated with intermediate geometries of the geologic objects reproduced by the obtained kinematic model, zones more likely to contain fluids such as hydrocarbons can be readily located or identified in the subsoil.

The method can comprise subdividing each geologic object into layers separated from one another by deformation interfaces (distributed only on the contact surfaces or on intermediate ductile layers).

The method can also comprise a geometrical modification of the grid patterns so as to take into account the effects of compaction.

The modeling method according to the invention, has two parts which are conservation of the surface area of the neutral surface and alternation of rigid layers separated by shear interfaces or ductile interlayers. The model has the advantage of being easy to implement, coherently reproduces the inner deformations undergone by the layers and better represents the shear that can be observed between two rigid layers, even in cases of complex structures.

The model obtained with the method of the invention allows reconstruction of a geologically acceptable deformation course. All the intermediate geometries of the evolution process followed by the sedimentary basin are reproduced incrementally in time.

This type of basin model is an invaluable tool for geologists which allows showing permeability variation, the expulsion of fluids by compaction, the calculation of thermal transfers in the basin, the maturation of the organic matter and the circulation of the fluids, and facilitates defining hydrocarbon accumulation zones and the most favorable conditions for developing them.

BRIEF DESCRIPTION OF THE DRAWINGS

Other features and advantages of the method according to the invention will be clear from reading the description hereafter of non limitative examples, with reference to the accompanying drawings wherein:

FIG. 9 is a flow chart of the method of the present invention.

DETAILED DESCRIPTION OF THE PREFERRED EMBODIMENTS OF THE INVENTION

Principle of the Model

The deformation of a layer of a sedimentary basin can be considered to be globally rigid, the inner deformations being local and situated at the interfaces between the layers or at the slope break points. This deformation by rigid blocks is made possible, on the one hand, by cataclastic processes allowing motion of blocks by fracturation-breaking at the boundary thereof, and on the other hand by a creep phenomenon through dissolution-crystallization under stress. In the latter case, the relative displacements of the blocks are combined with dissolution processes in the zones subjected to the highest stresses (stylolites, cleavage structure) and with precipitation into the empty spaces open between the blocks through deformation (crystal fissures).

To carry out the modeling operation, the zone to be modelled is divided into blocks of greater size (hm-km) that can be readily dealt with by the commonly available calculating devices, considering that the smaller-scale processes (inner deformations) will be represented by the empty spaces and overlaps observed with the model.

Figure 1:
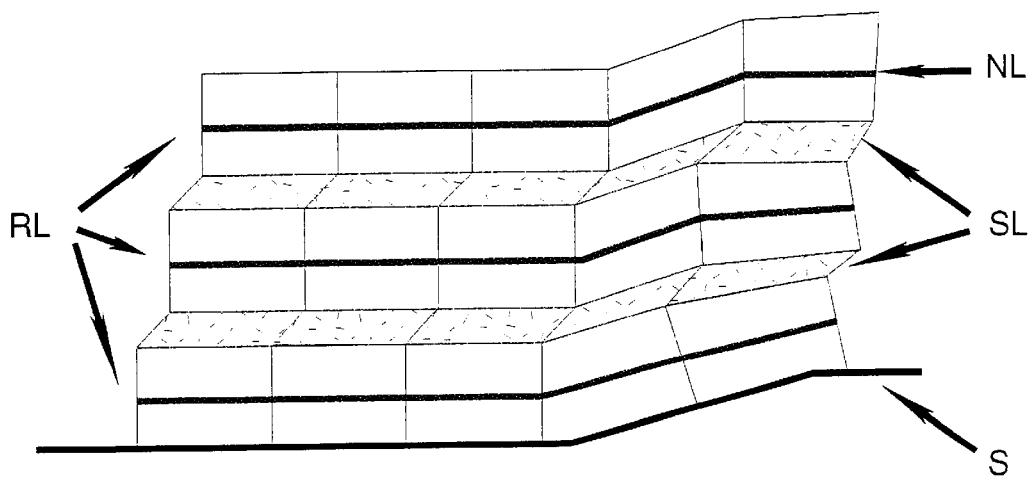
FIG. 1 shows a neutral surface NL and sheared interfaces SI on a diagrammatic example of discrete layers, FIG. 2 diagrammatically shows the deformation mechanism of a crest, FIGS. 3A and 3B diagrammatically show in 3D a basin consisting of a superposition of two blocks separated by a ramp, before deformation (FIG. 3A) and after deformation (FIG. 3B)

As shown in FIG. 1, each layer RL is divided into blocks (three-dimensional hexahedrons) that move rigidly on slippage support S (i.e. by translation and rotation). The volume of all of the blocks of each layer RL remain constant, the blocks having the distinctive feature of being able to interpenetrate and to break up, thus creating empty spaces and overlaps. The global aspect of the displacement is thus represented by the sum of the displacements of the blocks, whereas the local part of the deformation is in the overlaps and the empty spaces.

The modeling mode selected here takes into account the volume variations of the blocks linked for example with compaction phenomena. Compactions increasing with the depth or compactions linked with tectonic processes can be introduced independently for each block and at each deformation increment.

In nature, the deformation of a layer, if it can be considered to be globally rigid, is linked with a main mechanism which is a flexion mechanism, in the case of a region subjected to compressive tectonics. During flexion, the deformation of the layer preferably occurs in the intermediate zone and along the flanks.

Folding leads to a compression at the intrados and to an extension at the extrados of the layer, increasing with the thickness thereof. Between the intrados and the extrados, the neutral surface has a length which remains constant during the transformation. In the case of 3D modeling, it is the surface area ef the neutral surface that remains constant.

In order to model the deformations of each layer, a superposition of surfaces is considered on either side of a neutral line or surface NS, which are deformed according to their position in relation to this line or surface. It is thus no longer a volume that is deformed, but surfaces superposed in space. In order to observe the fixed constraint of the rigidity of the various blocks, the vertical crests are considered to retain their height and cannot be deformed. Each crest is reconstructed by means of a rotation around a neutral surface NS, which allows keeping the thickness (and the size) of the blocks in the simplest cases, and to modify both if they can be estimated.

Another problem concerns the relation between the successive layers RL. In fact, the empty spaces and overlaps observed within the scope of a rigid-block model, which are caused by displacement, make it difficult to define the <<roof>> of a layer, which does not allow the slip at the interfaces between the layers to be taken into account properly, whereas the hypothesis of slippage between the layers is fundamental in models referred to as flexural slip models which are well-known. In order to take it into account in the model, shear interfaces SI are added between each layer RL folded through flexion (FIG. 1), which allows having a perfect continuity of the initial grid pattern of the successive layers.

The model is thus formed by respecting the following three rules:

a) the layers fold through flexion and slip in relation to one another;

b) the transformation can be isopachic (the thickness considered is the normal distance to the support of neutral line or surface NS), or with a variable thickness if it can be estimated at each increment, and c) the surface area of the neutral surface is conserved during the transformation or modified if variations can be estimated.

In the following examples, the thickness and the surface are conserved. The neutral element (the neutral line or surface) is deformed by a slippage parallel to the support of the layer, so to be a constant distance from the support. The vertical crests, which are reconstructed by means of a rotation around the neutral element while keeping the angle with the support, represent the rigid part of the deformation mentioned above.

Formal Translation of the Modeling Algorithm

The Domain

Figure 3A:
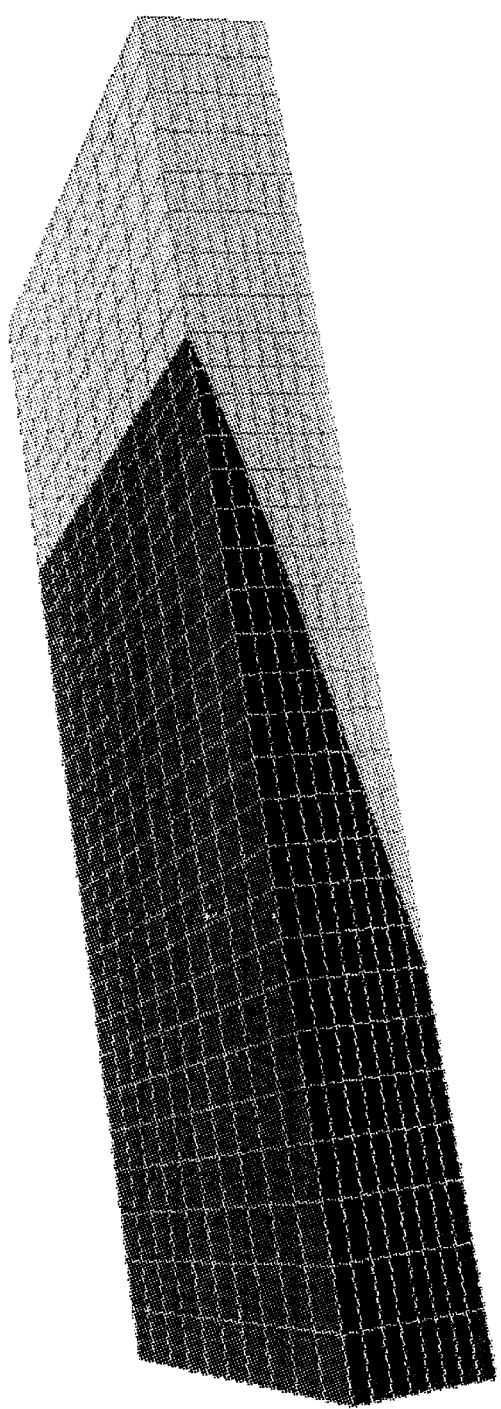

The basin is first split up into blocks separated by faults, then each block is subdivided into layers and each layer is subdivided into elements as shown in FIG. 3a. The elements of each layer are <<hexahedrons>> with eight vertices.

The layers allow construction of the slippage support which is a parametrized surface $C^0$: assembly of plane surfaces $C^1$ defined by means of the coordinates of the vertices of the elements. For the first layer of the block, support $C^0$ is constructed from the faces at the base of the elements: quadrilaterals which, once <<split up>>, give two triangular surfaces $C^1$. For the upper layers, the same procedure is repeated, but on the roof of the preceding layer.

The Unknowns

The unknowns of the deformation are the coordinates of the nodes (the vertices of the elements) after transformation. The deformation being assumed to be rigid, the coordinates of the transform are provided by the solution to the translation applied to each node of the neutral surface:

$$\vec{t} = \delta \vec{v} \quad (1)$$

where $\delta$ is a displacement distance and $\vec{v}$ the unitary direction of the displacement. In parametric form:

$$M' = \vec{t}(M) \quad (2)$$

$$\begin{cases} x' = x + v_r \delta \\ y' = y + v_y \delta \\ z' = z + v_z \delta \end{cases} \quad (3)$$

The Displacements

The displacement of the layer takes place from the displacement of the neutral surface. The neutral surface is first assumed to be the surface passing through the mid-points of the vertical crests of the layer. Its displacement merges with that of the crest mid-points. The operation applied for the deformation being a curvilinear translation, the surface is conserved.

The other conservation principle to be checked is the isopachity of the layers during the displacement. The point is therefore translated on a straight line parallel to the support, and at a constant distance from the support. This distance is kept by introducing mid-planes of the support and by means of the system of parametric equations described below.

First the distance from crest mid-point M with the intersection point of mid-plane I is calculated. Let $\vec{v}_H$ be the projection of $\vec{v}$ on the plane of support $P_S$ along the normal to $P_S$ and $P_{med}$ the mid-plane, such that:

$$\vec{v}_H = \begin{cases} v_{h_r} \\ v_{h_y} \\ v_{h_z} \end{cases} \quad (4)$$

$$(P_{med}): a_m x + 3_m y + a_m z + h = 0 \quad (5)$$

Point I is the intersection of $P_{med}$ with line D defined by:

$$D: \begin{cases} M_x + v_{h_x} t \\ M_y + v_{h_y} t \\ M_z + v_{h_z} t \end{cases} \quad (6)$$

The coordinates of I are thus:

$$I: \begin{cases} M_x + v_{h_x} t_i \\ M_y + v_{h_y} t_i \\ M_z + v_{h_z} t_i \end{cases} \quad (7)$$

with $t_i$:

$$t_i = \frac{-(\alpha_m M_x + 3_m M_y + \lambda_m M_z + h)}{(\alpha_m v_{h_x} + \beta_m v_{h_y} + \gamma_m v_h)} \quad (8)$$

Let $d = \|\vec{MI}\|$, knowing that $\delta$ is the displacement distance, then:

If $d > \delta$, point $M' = \vec{t}(M)$ is defined by:

$$M' = \begin{cases} M_x + v_{h_x} \delta \\ M_y + v_{h_y} \delta \\ M_z + v_{h_z} \delta \end{cases} \quad (9)$$

if $d = \delta$, point M' merges with point I.

If $d = \delta$, point M must shift by the distance $\delta - d$. The same series of operations is thus carried out, I being considered to be the new point M, and the new mid-plane $P_{S2}$ is calculated. M' is then defined by:

$$M' = \begin{cases} I_x + v_{h_x}(\delta - d) \\ I_y + v_{h_y}(\delta - d) \\ I_z + v_{h_z}(\delta - d) \end{cases} \quad (10)$$

For convenience reasons, the notation of $\vec{v}_h$ has not changed, but the vector evolves according to the support.

Reconstruction of the Crests

Figure 2:
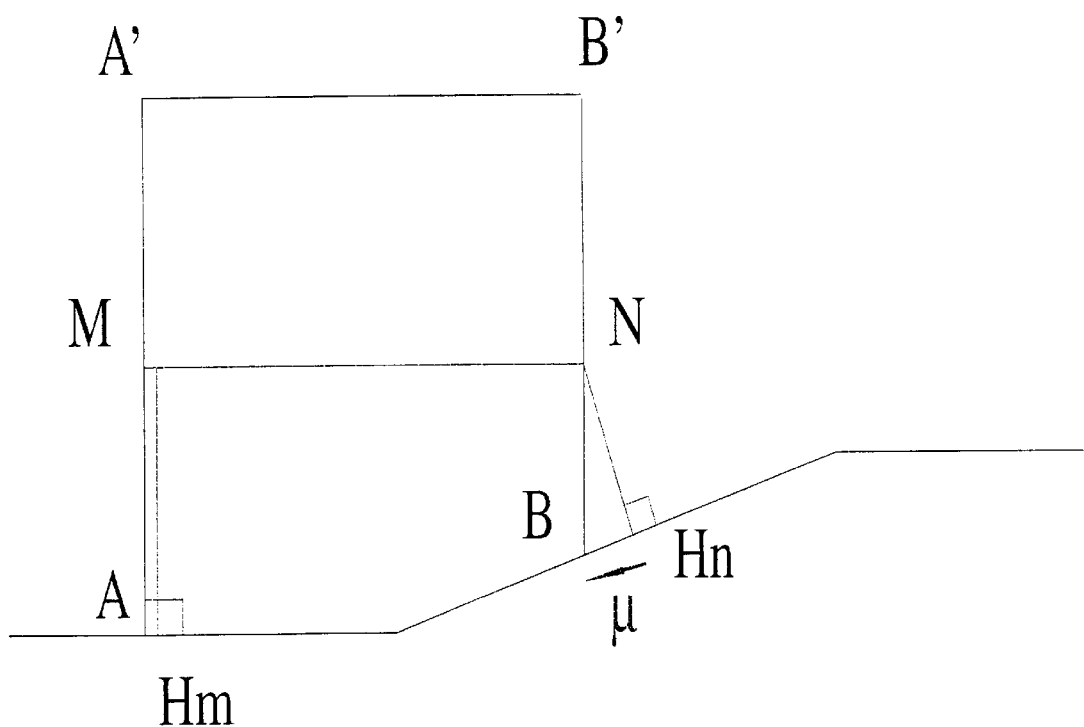

The reconstruction of the crests is the second part of the deformation algorithm. The vertical crests are assumed to be rigid, their height is therefore conserved, as well as the angle it forms with the support. To achieve these conservations, the fact that the normal distance to the support of a point of the neutral surface is constant is used: to conserve the angle, it is assumed that the distance between the base of the crest and the normal projection upon the support of the point of the neutral surface belonging to the crest is constant. This distance is symbolized in FIG. 2 by curvilinear vector $\vec{\mu}$.

Once the reconstruction is completed and the layers are slipping on one another, the connectivity of the initial grid pattern can be broken. In order to avoid this, a <<shear interface>> is created between each layer so as to keep the connectivity (see FIG. 1) in the same spirit as the induced drag folds. The thickness of this interface can be zero or not, according to the desired modeling.

Validation of the Modeling Method

The method was validated by qualitative comparison with conventional 2D methods such as those described in the aforementioned Suppe reference or in the aforementioned French patent 2,748,516, with the following examples. It affords the advantage of being more general and accepts very different geometries. Its formulation is very simple, which leads to very reasonable calculating times.

Cylindrical Ramp Fold

Figure 3B:
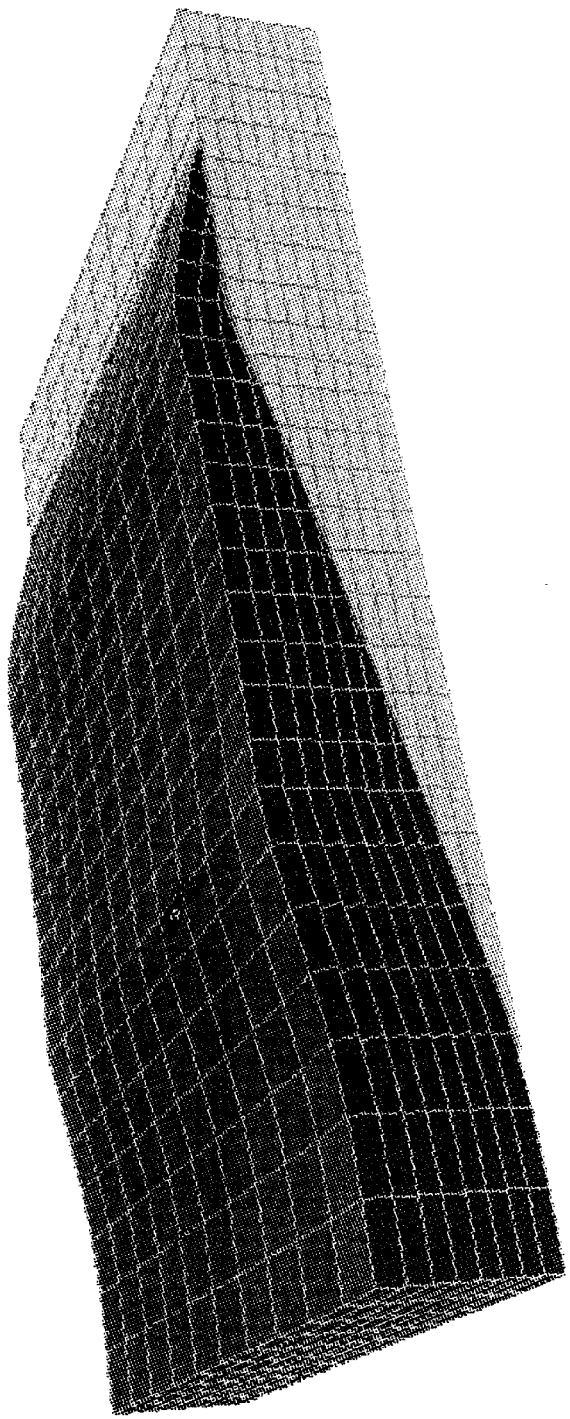
Figure 4A:
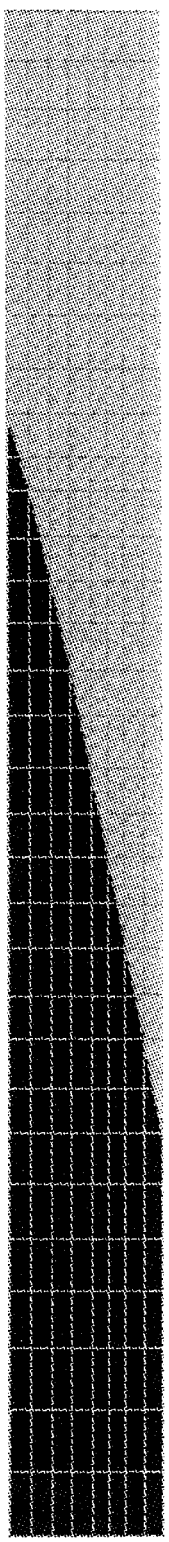
FIGS. 4A to 4D show in 2D respectively various states of evolution of a basin section, separated by time increments, FIG. 5 diagrammatically shows in 3D the deformation after displacement with shear.
Figure 4B:
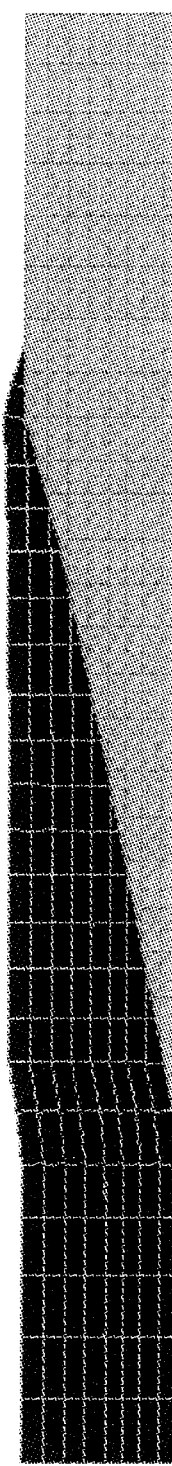
Figure 4C:
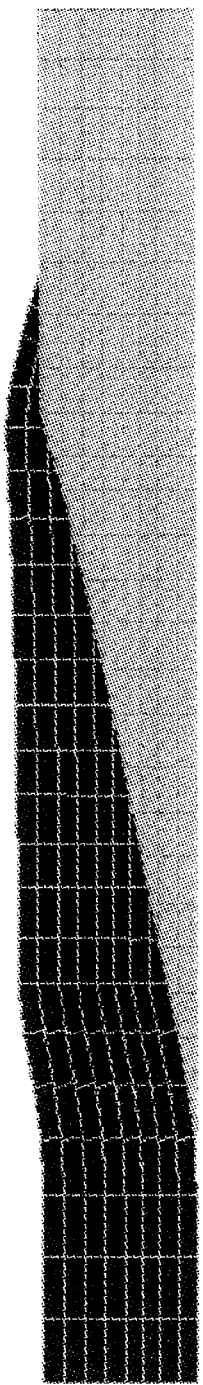
Figure 4D:
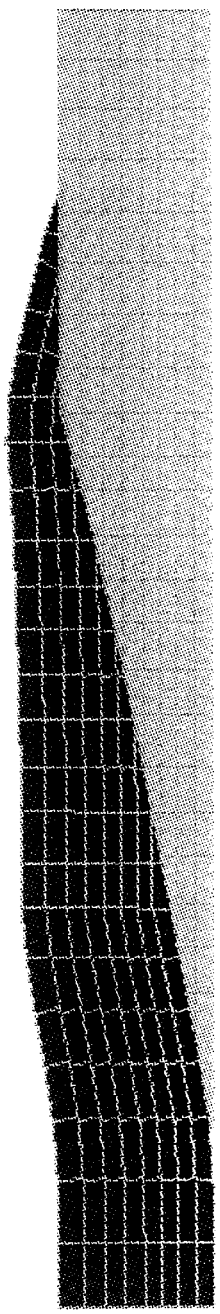

The objective of this example is to test the validity of the 3D algorithm The test case is a succession of ten identical geologic sections. The basin consists of two blocks; the layers of the moving blocks are subjected to three successive 1000-m displacements (see FIGS. 3a and 3b). The displacement quantity is applied homogeneously on the edge, in the direction parallel to that of the ramp.

FIGS. 4A, 4B, 4C and 4D respectively show various states of evolution of a section of a basin separated by time increments. It can be seen that the results obtained are similar to those provided by conventional two-dimensional codes.

Ramp Fold with Shear

The previous basin (consisting here of four layers) is deformed by means of a shear parallel to the direction of the ramp, so that the displacement distance δ is defined, at each increment, by:

$$\delta = 1000\frac{(ymax - y)}{ymax} \quad (11)$$

The basin will thus have a fixed edge, whereas the opposite edge will move by 3000 m.

The results (see FIG. 5) are coherent in relation to those obtained with the semi-3D geometrical modellings such as those described by Scott et al. mentioned above.

Variable Ramp Fold

Figure 6A:
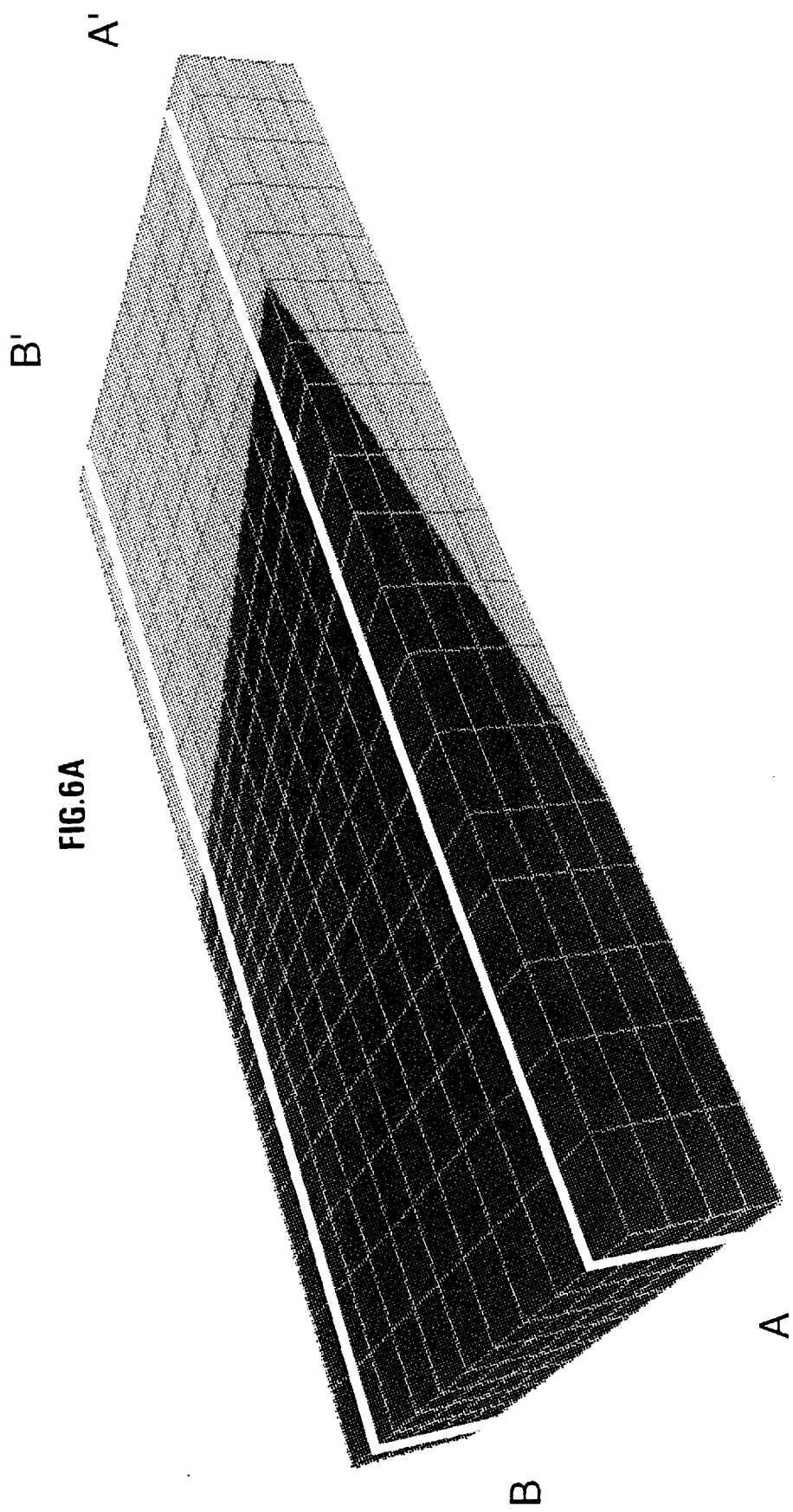
FIGS. 6A and 6B show, with a time interval, two successive states of the same basin with a ramp whose dip evolves widthwise, respectively before a deformation with shear (FIG. 6A) and after this deformation (FIG. 6B), FIGS. 7A and 7B diagrammatically show in 2D two successive states of the basin, where the slope of the ramp is 20° (section AA'), and FIGS. 8A and 8B diagrammatically show in 2D two successive states of the same basin, where the slope of the ramp is 60° (section BB').
Figure 6B:
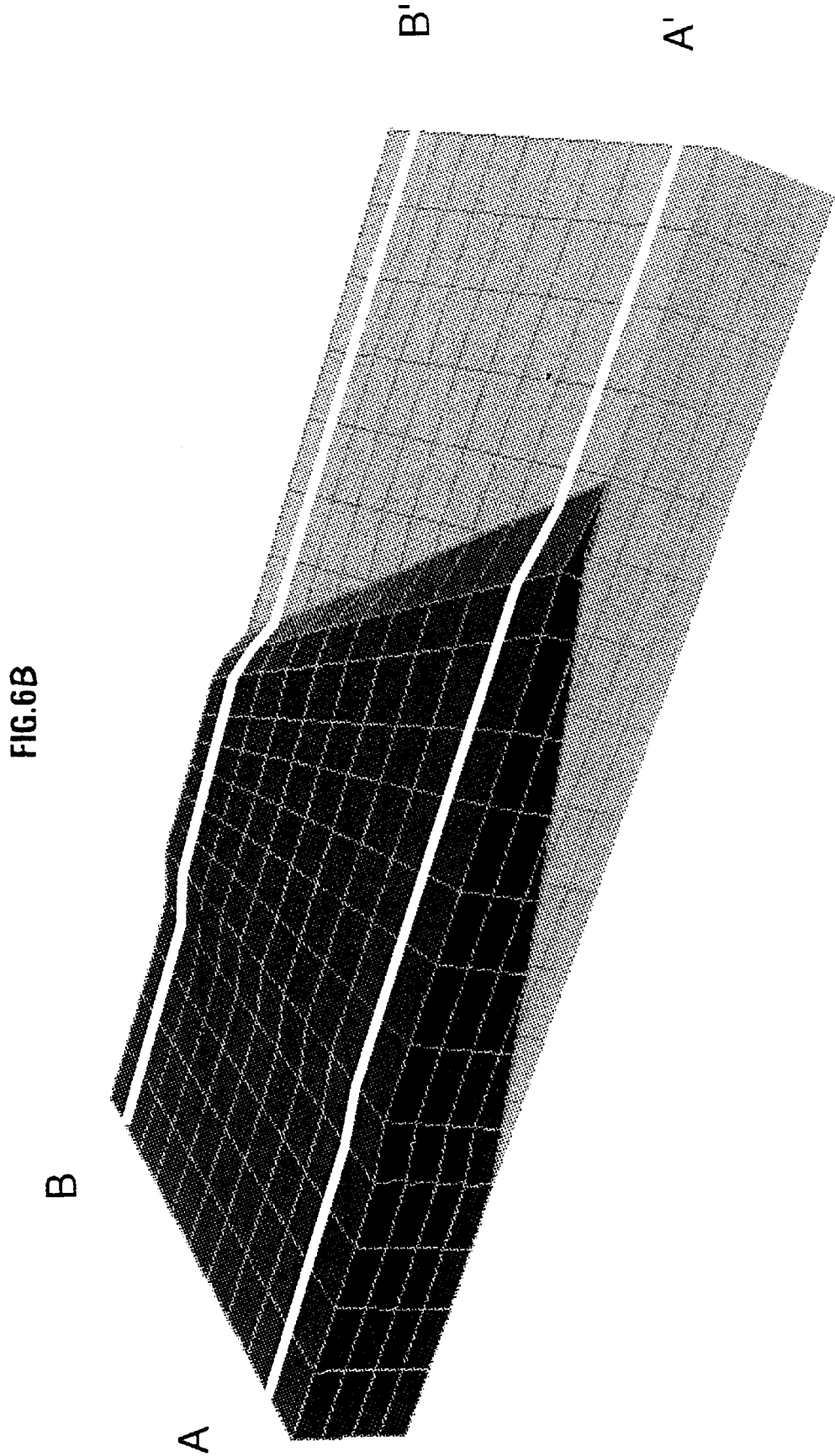
Figure 7A:
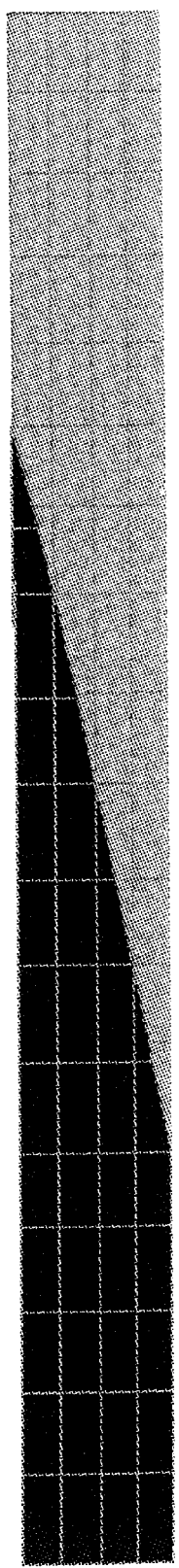
Figure 7B:
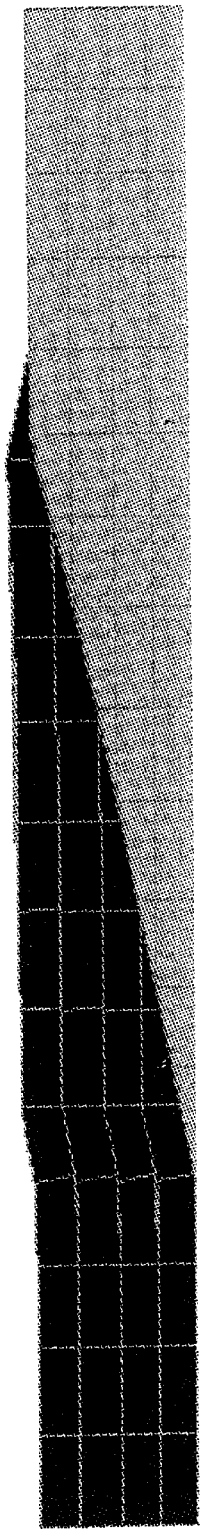
Figure 8A:
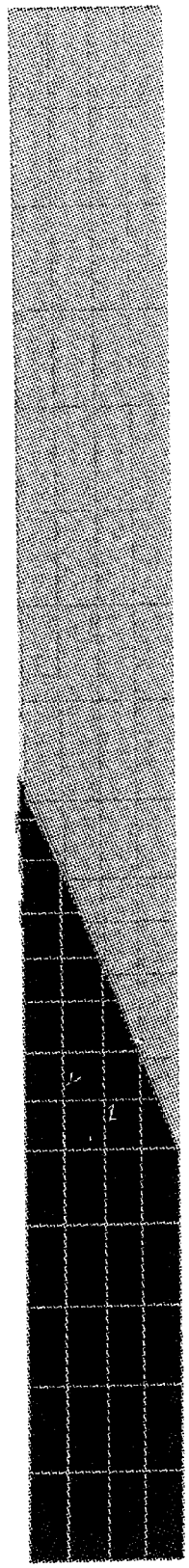
Figure 8B:
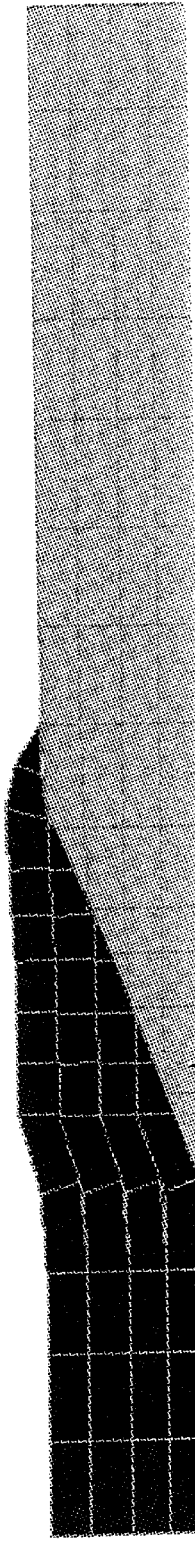

The basin considered is no longer cylindrical (FIG. 6A): the dip of the ramp evolves widthwise, from twenty degrees (section AA') to more than sixty degrees (section BB'). The boundary condition is a uniform displacement: 1000 meters in a time interval (see FIGS. 6A and 6B).

FIGS. 7A and 7B and 8A and 8B respectively show sections AA' and BB' before and after deformation. Here again, the results obtained are similar to those given by semi-3D geometrical methods and, unlike conventional models, they remain valid and coherent for ramp dips above sixty degrees. The algorithm proposed here thus allows to study cases of more complex geometry.

The results presented of the modeling method of the invention show a capacity for dealing with all the problems that can be dealt with by a semi-3D model.

FIG. 9 illustrates a flow chart of a method for forming a prograde kinematic model which reproduces in the number 3D intermediate geometries of geological objects of an underground zone, between an initial state and a known final state, the geometry of the geological objects of the zone being determined to be in the final state by interpretation of acquired data obtained by seismic exploration by in-situ measurements and by observations which comprises the following steps. The method proceeds from step 10 of selecting a geometry of the geological objects in an a pried initial stage of the underground zone. The method proceeds to step 12 wherein subdividing each geological object in the initial state thereof into layers occurs. The method proceeds to step 14 wherein each layer being defined by a grid pattern into a series of hexahedral volume elements occurs. The method proceeds to step 16 wherein applying separately and successively tectonic deformations to each series of the volume elements of a layer in relation to an underlying layer with conservation of thickness of the layer and conservation of a surface area of an intermediate neutral surface in each volume element so as to obtain a geological representation occurs. The method proceeds to step 18 wherein comparing the geological representation and the final state of the underlying zone occurs. In addition, the underground zone is determined to be in a final known state at step 20 with the results thereof being provided to step 18. The method proceeds from step 18 to decision point 22 at which iteratively modifying the initial state and repeating steps 12,14, 16 and IS occurs until a geological representation substantially best fitting the final state of the underground state is obtained. If the answer is "no" at decision point 22, the process proceeds back to step 10. If the answer is "yes" at decision point 22, the process proceeds to the end 24.

What is claimed is:

1. A method for forming a kinematic model allowing reproduction in 3D intermediate geometries of geologic objects of an underground zone, between an initial state and a known final state, the geometry of the geological objects of the zone being determined to be in the final state by interpretation of acquired data obtained by seismic exploration, by in-situ measurements and by observations, comprising the steps of:

a) subdividing each geologic object in the initial state thereof into layers, each layer being defined by a grid pattern into a series of hexahedral volume elements;

b) applying separately and successively tectonic deformations to each series of the hexahedral volume elements of a layer in relation to an underlying layer with conservation of the thickness of the layer and conservation of the surface area of an intermediate neutral surface in each volume element so as to obtain a geological representation;

c) comparing the geological representation and the final state of the underground zone; and d) iteratively modifying the initial state and repeating steps a) to c) until a geological representation substantially best fitting the final state of the underground zone is obtained.

2. A method as claimed in claim 1, comprising:

subdividing each geologic object into layers separated from one another by deformation interfaces.

3. A method as claimed in claim 2, wherein:

the deformation interfaces consist of the contact surfaces between the layers.

4. A method as claimed in claim 2, wherein:

the deformation interfaces consist of intermediate ductile layers.

5. A method as claimed in claim 2, comprising:

providing a geometrical modification of the grid patterns which accounts for the effects of compaction.

6. A method as claimed in claim 1, comprising:

providing a geometrical modification of the grid patterns which accounts for the effects of compaction.

* * * * *